June 27, 1950 A. W. FRIEND 2,513,160

TRANSFORMER

Filed Oct. 2, 1945 2 Sheets-Sheet 1

INVENTOR
ALBERT W. FRIEND.
BY H. G. Grover
ATTORNEY

INVENTOR
Albert W. Friend
BY
H. G. Grover
ATTORNEY

Patented June 27, 1950

2,513,160

UNITED STATES PATENT OFFICE 2,513,160

TRANSFORMER

Albert W. Friend, Collingswood, N. J., assignor to Radio Corporation of America, a corporation of Delaware Application October 2, 1945, Serial No. 619,870

5 Claims. (Cl. 315—27)

The present invention relates to electrical transformers, especially coupling or output transformers of the type employed in television receiving systems which include a cathode ray image-reproducing tube. More particularly, the invention relates to means whereby a television coupling or output transformer may be utilized to regulate the size of the image raster scanned by the electron beam of such a cathode ray tube.

The invention herein disclosed constitutes a further development of the invention set forth in my copending patent application, Serial No. 619,869, filed concurrently herewith, and entitled "Television System," issued October 12, 1948, as Patent No. 2,451,026.

Television receiving systems utilizing the principle of electromagnetic deflection of a cathode ray scanning beam normally include a power output tube which is adapted to deliver cyclically varying current, a portion of each cycle of which varies in a substantially linear manner with respect to time, through a coupling transformer to a pair of cathode ray beam deflection coils encircling the neck of an image-reproducing cathode ray tube. Since the instantaneous angle of deflection of the cathode ray scanning beam is a function of the instantaneous strength of the magnetic deflecting field in the vicinity of the deflection coils, and since this deflecting field is, in turn, dependent upon the amplitude of the current flowing through the deflection coils at such time, it follows that a change in the peak amplitude of the current flowing through the deflection coils will produce a change in the size of the image raster scanned by the cathode ray beam.

In my copending application referred to above, it is pointed out that control over the peak amplitude of the deflecting current for the purpose of image size regulation is normally accomplished by means of a variable inductance shunted across several turns of the secondary winding of the coupling transformer. The tap required on the transformer secondary winding is not only inconvenient from the standpoint of assembly, but also adds to the equipment cost, while the extra variable inductor increases the size and weight of the television apparatus.

The invention of the above-mentioned copending application eliminates the necessity for a separate variable inductor for image size regulation by utilizing the coupling transformer itself as a size control. In one preferred embodiment, this is achieved by forming, in the transformer core, an aperture which is adapted selectively to receive a slug of magnetic material. This slug, by varying the permeability of the core as it enters the aperture, changes the overall impedance of the transformer. As a result, the peak amplitude of the cyclically varying current flowing through the cathode ray beam deflection coils is altered, thus effecting a change in the size of the image raster scanned by the cathode ray beam.

The present invention relates to a simplified form of coupling or output transformer suitable for use as an image size control in television receiving systems. This simplified form of coupling transformer, as herein disclosed, is preferably molded of powdered or comminuted iron or other finely divided ferro-magnetic material, in combination with a suitable binder. The entire section, or leg, of the core passing through the coil windings is arranged to be movable relative to the remainder of the core, and is separated into two parts along a cleavage plane essentially normal to the axis of the coil windings. The two parts of the core leg passing through the coil windings thus, in effect, form two slugs, one or both of which may be withdrawn from the coils, along the axis of the coils, to thereby vary the permeability of the core. Such a transformer construction consists, in addition to the coils themselves, of only four parts—two core frame sections and two core leg sections or slugs—and hence is simply molded, easily assembled, of low cost, and capable of high performance.

One object of the present invention, therefore, is to provide an improved form of image size control for television receiving systems.

Another object of the present invention is to provide means whereby the usual output or coupling transformer in television deflection circuits may be modified to act as an image size control device.

A still further object of the invention is to provide a coupling or output transformer, suitable for use in television systems, which is simply molded of powdered iron or other finely divided ferro-magnetic material, and which is conveniently assembled, relatively inexpensive, and which possesses maximum electrical transfer characteristics.

Other objects and advantages will be apparent from the following description of a preferred form of the invention and from the drawings, in which.

Figures 1, 2, 3, 4:
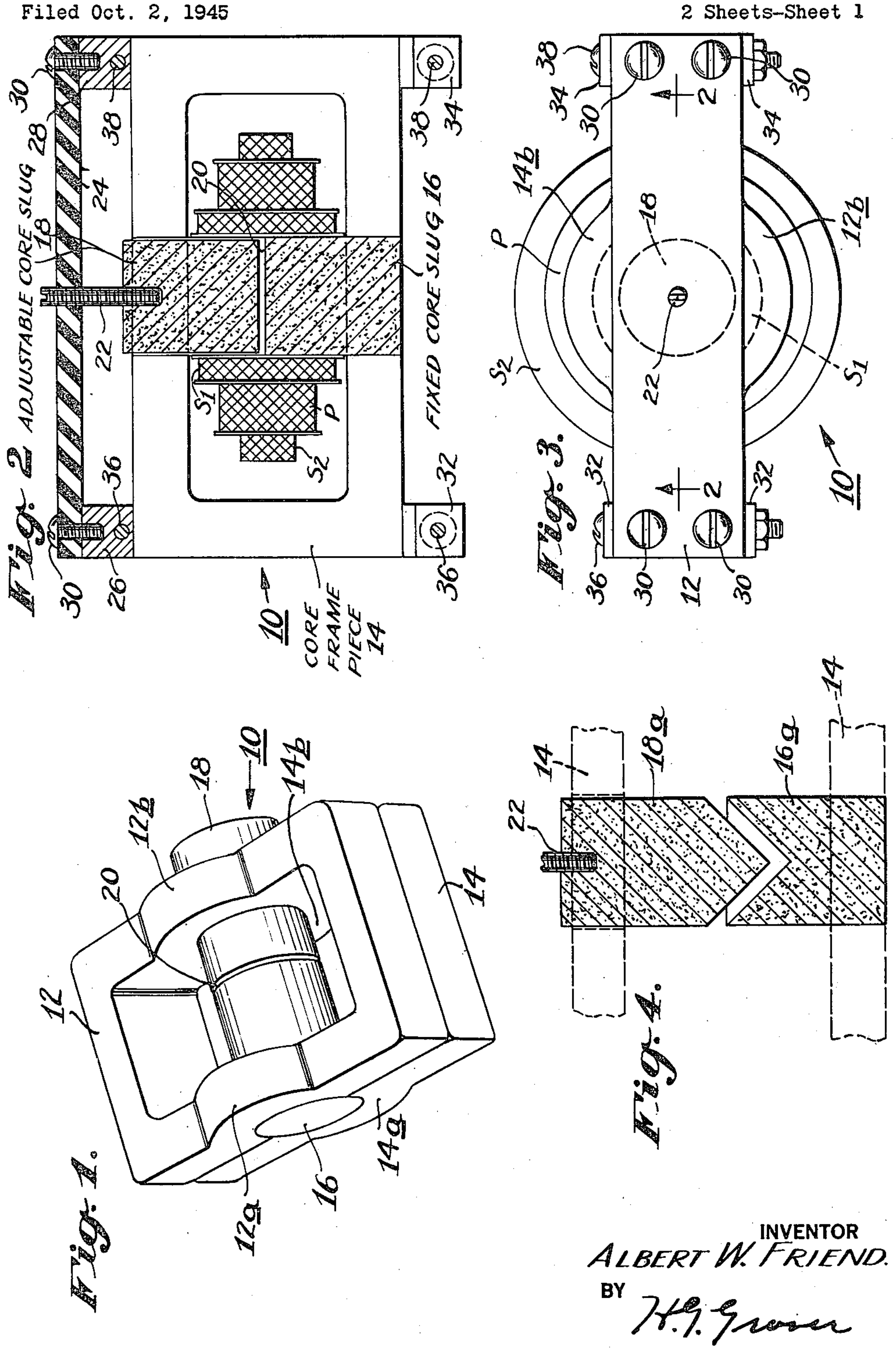
Fig. 1 is a perspective view of a coupling or output transformer in accordance with the present invention, the coil windings being omitted.
Fig. 2 is a sectional view of the coupling transformer of Fig. 1, with the coil windings and slug-adjusting means added.
Fig. 3 is a top plan view of the coupling transformer of Fig. 2.
Fig. 4 is a sectional view of an alternative construction for the two core slugs of the coupling transformer of Figs. 1, 2 and 3.

In Figs. 1, 2 and 3 is shown a coupling or output transformer, generally indicated by the reference character 10. The core of transformer 10 is composed of two matching frame pieces 12 and 14, best shown in Fig. 1, and two central leg sections, or slugs, 16 and 18. Each of these core components 12, 14, 16 and 18 is molded of some suitable finely divided ferro-magnetic material, such as powdered or comminuted iron, in combination with a binder. The matching frame pieces 12 and 14 are each preferably rectangular in shape, with the central portion of the two long sides of each frame piece being curved away from the plane of the frame piece, as shown at 12*a*, 12*b*, and 14*a*, 14*b* respectively. The inner surface of each of these curved portions 12*a*, 12*b*, 14*a* and 14*b* is semi-cylindrical in shape, so that when the matching frame pieces 12 and 14 are in face-to-face relation, as best shown in Fig. 1, then the inner surfaces of curved portions 12*a* and 14*a* define an aperture of cylindrical outline, as do also the inner surfaces of curved portions 12*b* and 14*b*.

The central leg section, or slug, 16 is cylindrical in shape, and is so dimensioned as to fit securely in the aperture of cylindrical outline defined by the curved core portions 12*a* and 14*a*. Similarly, the cylindrical central leg section, or slug, 18 is so dimensioned as to fit securely but movably in the aperture defined by the curved core portions 12*b* and 14*b*.

Slug 16 is intended to remain clamped in a selected position between the frame pieces 12 and 14, with a predetermined percentage of the slug extending within the core frame and toward the slug 18. The slug 18, on the other hand, is intended to be movable relative both to slug 16 and to the frame pieces 12 and 14, so that the dimensions of the air gap 20 between slugs 16 and 18 may be varied.

The means for moving the slug 18 relative to the slug 16 is shown in Figs. 2 and 3. A screw 22 is embedded in, or otherwise securely affixed to, the slug 18. This screw 22 passes through a threaded opening in a support 24, the latter being positioned apart from the core frame pieces 12 and 14 by two spacers 26 and 28. A plurality of screws 30 secure support 24 to the spacers 26 and 28.

The core frame pieces 12 and 14 are held against one another as well as against the spacers 26 and 28 by means including two pairs of brackets 32 and 34 respectively. Two pairs of screws 36 and 38 respectively pass through the two pairs of brackets 32 and 34. When these screws 36 and 38 are tightened, they tie the various core elements and slug-adjusting means into a unitary transformer structure, as shown in Figs. 2 and 3.

The adjacent surfaces of the cylindrical core leg sections or slugs 16 and 18 are substantially flat or planar in the embodiment of the invention illustrated in Figs. 1 through 3. However, where precise adjustment of the air gap 20 is necessary or desirable, the slugs may be formed with mating conical surfaces as shown by the sectional views of two such slugs 16*a* and 18*a* in Fig. 4. This allows a greater travel of slug 18*a* along its axis of movement for a fixed amount of gap adjustment. As required, the mating faces of the slugs 16 and 18 may be wedge-shaped, or of many other possible configurations, without departing from the spirit of the invention.

The provision of semi-cylindrical butt-joint surfaces between the slugs 16 and 18 and the curved core portions 12*a*, 14*a*, 12*b*, and 14*b* respectively makes possible a large surface area of butt-joint contact, so that the air gap reluctance of the core is reduced to a minimum.

Three coil windings overlie one another around the central core leg sections or slugs 16 and 18, as shown in Figs. 2 and 3. These windings consist of a secondary coil $S_1$ wound nearest the slugs, a primary coil P wound over the coil $S_1$, and an additional secondary coil $S_2$ wound over both coils $S_1$ and P. The coils are separated from one another and from the slugs 16 and 18 by any suitable insulating medium.

It will be appreciated that, upon selective turning of screw 22, the cylindrical slug 18 will be moved axially so as to vary the width of the air gap 20. When an alternating current is flowing through the primary coil P, such a variation in the width of the air gap 20 will alter the magnetic flux density in the core frame sections 12 and 14. The result of such a change in the flux density in the core sections 12 and 14 is to alter the overall impedance of the transformer 10 as reflected into an input circuit connected to the primary winding P.

Figures 5, 6, 7:
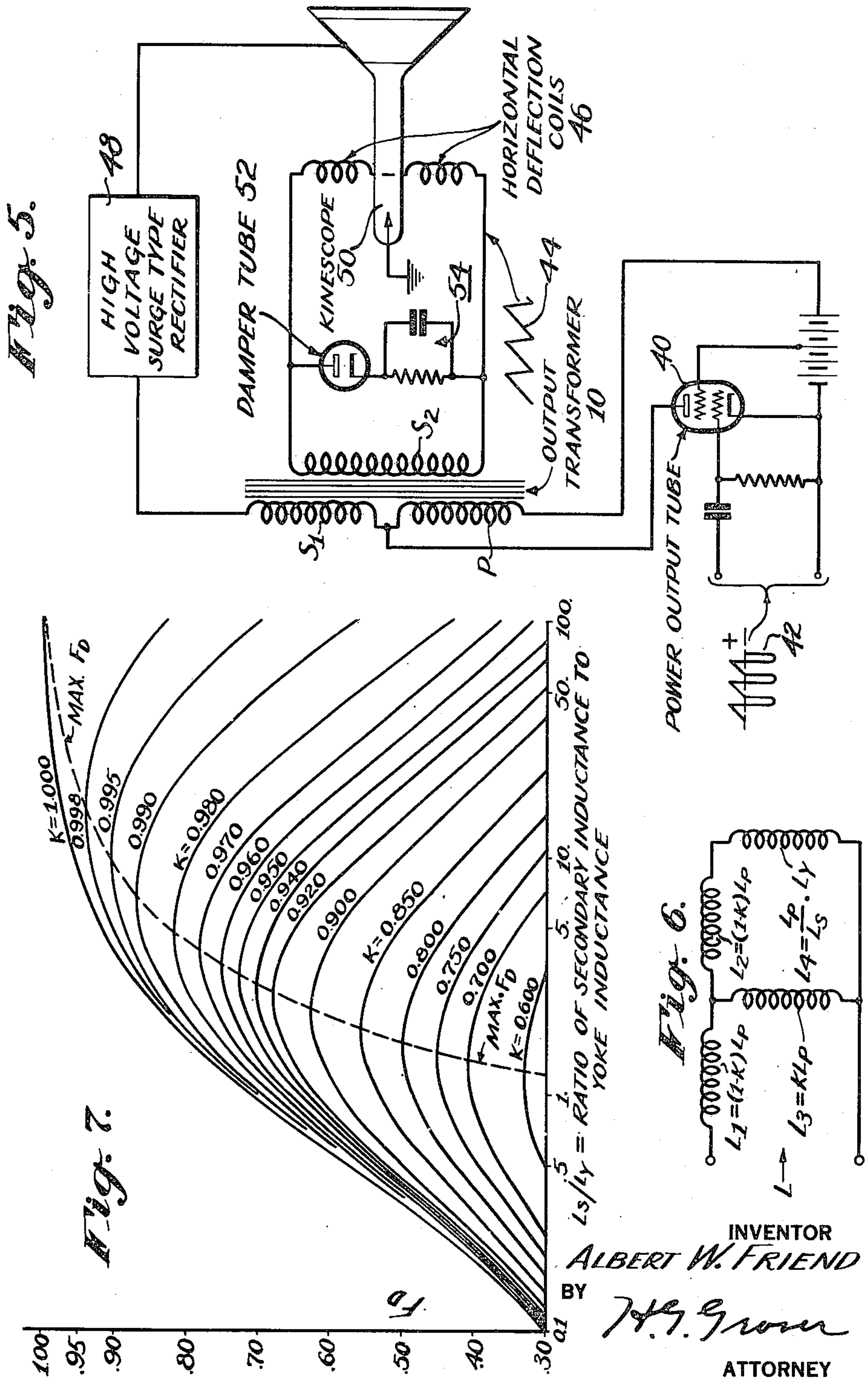
Fig. 5 is a diagram of one possible circuit in which the transformer of Figs. 1, 2 and 3 might be employed.
Fig. 6 is a diagram of a simplified circuit equivalent from an impedance standpoint to the circuit of Fig. 5.
Fig. 7 is a set of curves useful in determining the operating characteristics of transformers constructed in accordance with the present invention.

Fig. 5 shows one possible circuit in which the transformer of Figs. 1 through 3 might be employed, although it will be clearly understood that this particular circuit is being given merely as an illustration, and that the transformer of the present invention is suitable for use in numerous systems where it is desired to couple one circuit portion to another.

In Fig. 5 is shown a cathode ray beam deflection circuit including a power output tube 40 having at least an anode, a cathode, and a control electrode. Power tube 40 is adapted to deliver, when voltage variations having a waveform such as indicated by the reference character 42 are applied between the cathode and control electrode thereof, cyclically varying current, a portion of each cycle of which varies in a substantially linear manner with respect to time as shown by the saw-tooth current waveform 44, to a pair of cathode ray beam deflection coils 46 through the output or coupling transformer 10 (shown schematically in Fig. 5).

The primary winding P of transformer 10 is connected in the output, or anode-cathode, circuit of power tube 40. The secondary winding $S_1$ steps up the voltage developed across the primary winding P for application to a high-voltage surge-type rectifier 48 which may, for example, be of the type set forth in a copending application of Otto H. Schade, Serial No. 578,678, filed February 19, 1945, issued April 6, 1948, as Patent No. 2,439,223. The output of rectifier 48 is applied to the accelerating electrode of an image-reproducing cathode ray tube or kinescope 50.

The secondary winding $S_2$ of transformer 10 is wound or connected in a direction opposite to that of both windings P and $S_1$. A damper tube 52, in series with a parallel resistance-condenser combination 54, is connected across the secondary winding $S_2$. Damper tube 52, together with the resistance-condenser combination 54, prevents oscillations in the circuit by acting as a switch which closes at the end of the return, or snap-back, portion of each cycle of the sawtooth current wave 44, or, in other words, at the beginning of each deflection cycle. The switching operation of tube 52 causes a current to flow therethrough which is of such waveform as to assist the power tube 40 in producing the desired linear current variation through the deflection coils 46. The operation of such a damper tube is set forth in United States Patent No. 2,309,672, granted on February 2, 1943, to Otto H. Schade, and hence will not herein be described in detail.

The horizontal cathode ray beam deflection coils 46 preferably form part of a yoke assembly (not shown) encircling the neck of kinescope 50. As illustrated in Fig. 5, the series combination of damper tube 52 and resistance-condenser combination 54, as well as the horizontal deflection coils 46, are connected in parallel interrelation across the secondary winding $S_2$ of transformer 10.

It will now be appreciated that by varying the air gap 20 (Fig. 2) through adjustment of screw 22, the flux density in the core frame sections 12 and 14 is altered. This results in a change in the overall impedance of transformer 10, and a change in the peak amplitude of the sawtooth current wave 44 flowing through the horizontal deflection coils 46. Since the instantaneous angle of deflection of the cathode ray scanning beam of kinescope 50 is a function of the instantaneous strength of the magnetic deflecting field, which, in turn, depends upon the amplitude of current wave 44, such a change in peak amplitude of current wave 44 produces a change in the size of the image raster scanned by the cathode ray beam.

The use of powdered or comminuted iron or other finely divided ferro-magnetic material for the construction of the transformer core components 12, 14, 16 and 18 has the following advantages in comparison with cores composed of steel laminations:

1. The cost of the core structure is substantially lower.

2. Molded construction permits the fabrication of core shapes and designs not practicable with laminations.

3. The particle size distribution of the powdered iron material may be so selected that maximum permeability is attained in the frequency band of interest.

4. The low losses of powdered iron material in the television frequency range cause less heat loss in the transformer and hence a higher efficiency ratio.

5. The lower heat loss permits the enclosing of the transformer for protection against dirt and humidity.

6. The efficient energy transfer characteristics of the transformer permit reduction in the amount of power that must be delivered by the television power output tube or tubes. In some cases the number of power output tubes required may be reduced.

7. The acoustic energy radiation is considerably lower than with cores of the laminated type.

The efficiency of the powdered iron core transformer of the present invention is at a maximum when the horizontal deflection coils 46 form part of a yoke assembly provided with a core structure of approximately the same or an equivalent type of powdered iron material. In such cases, the circuit of Fig. 5 may be represented schematically by the equivalent circuit of Fig. 6, where L (with transformer 10) = L (without transformer 10, or in other words with the deflection coils 46 being connected directly in the anode-cathode circuit of power tube 40)

$L_p$ = inductance of primary winding P $L_s$ = inductance of secondary winding $S_2$ $L_y$ = inductance of deflection yoke including the deflection coils 46, and $k$ = the coupling coefficient between windings P and $S_2$.

Using the above terms in the simplified equivalent circuit of Fig. 6, it can be shown that $$L_1 - L_2 = (1-k)\cdot L_p$$

$$L_3 = k\cdot L_p, \text{ and}$$

$$L_4 = \frac{L_p}{L_s}\cdot L_y$$

During the trace portion of each scanning cycle of the sawtooth current wave 44, the ratio of the deflection amplitude which can actually be obtained by employing the transformer of the present invention, in combination with a deflection yoke constructed with a core of equivalent material, to the deflection amplitude which could be obtained if a yoke of suitable characteristics could be built to operate directly in the anode-cathode, or output, circuit of the power tube 40, is given by the formula $$F_D = \frac{1}{\sqrt{\left(\frac{L_s}{L_y}\right)\left(\frac{1}{k^2}-1\right)+\left(\frac{2}{k^2}-1\right)+\left(\frac{1}{k^2(L_s/L_y)}\right)}}$$

where $L_s$ and $L_y$ have been previously defined $$F_D = \frac{\text{Deflection produced with transformer and practical yoke}}{\text{Deflection produced with ideal yoke with no transformer}}$$

where $F_D$ is the deflection factor $k$ = the coupling coefficient between the primary winding P and the secondary winding $S_2$.

A plot of a family of curves representing $F_D$ as a function of $L_s/L_y$ for each of a number of probable values of $k$ is given in Fig. 7. It will be noted that for each value of $k$, there is a particular value of $L_s/L_y$ which produces the maximum deflection factor $F_D$. Equations for the determination of these maxima are $$\frac{L_s}{L_y} = \frac{1}{\sqrt{1-k^2}}$$

or, by substitution in the above equation, $$F_D \text{ (maximum)} = \sqrt{\frac{(L_s/L_y)-1}{(L_s/L_y)+1}}$$

This equation has been evaluated for the range of values plotted in Fig. 7, and is shown by a broken line with the legend "Max. $F_D$."

Since the above transformer characteristics are based only upon the scanning, or trace, portion of the deflection cycle, it is desirable in practice to modify the values derived from Fig. 7 so as to obtain better performance during the retrace period. For this purpose, the shunting capacitance of the windings P and $S_2$ should be reduced as much as practicable in view of the interlocking effect of such an action on the coupling coefficient *k*.

To make a sound compromise between the above factors, it is permissible to reduce the value of $L_s/L_y$ as much as 20% to 50% below the optimum value as shown in Fig. 7 in order to reduce the distributed capacity of the windings, such as by rearrangement thereof or by the installation of thicker interlayer insulation. Due to the broad maxima of the $F_D$ versus $L_s/L_y$ curves, however, such a reduction in the value of $L_s/L_y$ will, in most cases, reduce the deflection factor $F_D$ by less than 2% of its maximum value.

Having thus described my invention, I claim:

1. A core for an electrical transformer comprising, a pair of matching frame pieces of substantially rectangular configuration, said frame pieces being composed of comminuted magnetic material, the center portion of two opposite sides of each frame piece being curved away from the plane of that frame piece in such a manner that the inner surface is substantially semi-cylindrical in shape, said two frame pieces being positioned in face-to-face relation so that the adjacent curved portions of the two frame pieces together define two aligned apertures of cylindrical outline, and a pair of cylindrical core sections also composed of comminuted magnetic material respectively disposed in said apertures, one of said core sections being securely held by said frame pieces and the other core section being movable axially within its aperture and guided by said frame pieces.

2. Apparatus for regulating the size of the image raster scanned by a cathode ray beam in a television system, comprising a cathode ray beam deflection coil, a coupling transformer, a power output tube adapted to deliver cyclically varying current, a portion of each cycle of which varies in a substantially linear manner with respect to time, through the coupling transformer to the cathode ray beam deflection coil, said transformer including a core comprising a pair of matching frame pieces of substantially rectangular configuration, the central portion of two opposite sides of each frame piece of said pair being curved away from the plane of that frame piece in such a manner that the inner surface of each curved portion is substantially semicylindrical in shape, said two frame pieces being adapted for positioning in face-to-face relation so that the adjacent curved portions of the two frame pieces together define an aperture of cylindrical outline, a pair of cylindrical core leg sections respectively receivable in the apertures of cylindrical outline defined by the curved portions of said frame pieces when the latter are positioned in face-to-face relation, and means for actuating one of the said cylindrical core leg sections along its longitudinal axis to vary the apparent permeability of said core, whereby the peak amplitude of the cyclically varying current flowing through said cathode ray beam deflection coil is altered to effect a change in the size of the image raster scanned by the cathode ray beam.

3. A cathode ray beam deflection system including a transformer having a pair of matching frame pieces of substantially rectangular configuration, the central portion of two opposite sides of each frame piece of each pair being curved away from the plane of that frame piece in such a manner that the inner surface of each curved portion is substantially semi-cylindrical in shape, said two frame pieces being secured in face-to-face relation so that the adjacent curved portions of the two frame pieces together define two aligned apertures of cylindrical outline, a cylindrical core leg disposed in said apertures, a cathode ray beam deflection coil, a power output tube adapted to deliver a cyclically varying current output a portion of each cycle of which varies in a substantially linear manner with respect to time, and a circuit, including said transformer, for coupling said power output tube to said cathode ray beam deflection coil so that the current output of said power tube will flow through said coil.

4. A cathode ray beam deflection system according to claim 3 in which said cylindrical core leg is divided into two portions respectively disposed in the said apertures, the position of one of said core leg portions being fixed and the other portion being adjustable relative thereto thereby to vary with adjustment the coupling coefficient of said transformer and hence the amplitude of the cyclically varying current flowing through said cathode ray beam deflection coil.

5. A core for an electrical transformer comprising, a pair of matching frame pieces of comminuted magnetic material secured in face-to-face relation, said pieces being shaped to define two aligned apertures, a straight core portion secured in one said aperture by said frame pieces, another straight core portion of slightly smaller cross-section than the other aperture disposed therein and guided thereby for longitudinal movement, and means for adjusting the position of said movable core portion relative to the secured core portion, said core portions also being of comminuted magnetic material.

ALBERT W. FRIEND.

REFERENCES CITED

The following references are of record in the file of this patent:

UNITED STATES PATENTS

| Number | Name | Date |
|---|---|---|
| Re. 21,281 | Polydoroff | Nov. 28, 1939 |
| 409,714 | Thomson | Aug. 27, 1889 |
| 1,414,248 | Armor | Apr. 25, 1922 |
| 1,692,474 | Traver | Nov. 20, 1928 |
| 1,699,506 | Faus | Jan. 15, 1929 |
| 1,815,380 | Porter et al. | July 21, 1931 |
| 1,940,228 | Polydoroff | Dec. 19, 1933 |
| 2,096,801 | Grant | Oct. 26, 1937 |
| 2,180,413 | Harvey | Nov. 21, 1939 |
| 2,261,323 | Zierdt | Nov. 4, 1941 |